United States Patent
Jain et al.

(10) Patent No.: US 11,080,304 B2
(45) Date of Patent: Aug. 3, 2021

(54) FEATURE VECTOR PROFILE GENERATION FOR INTERVIEWS

(71) Applicant: International Business Machines Corporation, Armonk, NY (US)

(72) Inventors: Mohit Jain, Bangalore (IN); Ramachandra Kota, Hyderabad (IN); Pratyush Kumar, Guindy (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/825,733

(22) Filed: Nov. 29, 2017

(65) Prior Publication Data
US 2019/0163807 A1     May 30, 2019

(51) Int. Cl.
*G06F 16/28*      (2019.01)
*G06Q 10/10*      (2012.01)
*G06F 16/245*     (2019.01)
*G10L 15/26*      (2006.01)

(52) U.S. Cl.
CPC .......... *G06F 16/285* (2019.01); *G06F 16/245* (2019.01); *G06Q 10/1053* (2013.01); *G10L 15/26* (2013.01)

(58) Field of Classification Search
CPC ... G10L 15/26; G06Q 10/1053; G06F 17/274; G06F 16/285; G06F 16/245
See application file for complete search history.

(56) References Cited

U.S. PATENT DOCUMENTS

| 5,551,880 A | 9/1996 | Bonnstetter et al. |
| 6,058,163 A | 5/2000 | Pattison et al. |
| 8,265,983 B2 | 9/2012 | Gocha, Jr. |

(Continued)

OTHER PUBLICATIONS

Chen et al., "An Initial Analysis of Structured Video Interviews by Using Multimodal Emotion Detection," ERM4HCI 14: Proceedings of the 2014 workshop on Emotion Representation and Modeling in Human-Computer-Interaction-Systems, 2014, pp. 1-6, ACM. DOI: 10.1145/2668056.2668057.

(Continued)

*Primary Examiner* — Mark D Featherstone
*Assistant Examiner* — Ranjit P Doraiswamy
(74) *Attorney, Agent, or Firm* — James L. Olsen

(57) ABSTRACT

Aspects of the present disclosure concern cognitive interview management. Audio data from an interviewer in an interview is received. The audio data is processed by converting the audio data into structured text. The structured text is then analyzed to identify questions in the structured text. The structured text data is also analyzed to determine at least one tonal dimension, at least one class dimension, and at least one difficulty dimension of the structured text. A feature vector is then generated having the determined dimensions. A reference feature vector is received having at least one reference tonal dimension, at least one reference class dimension, and at least one reference difficulty dimension. The generated feature vector and reference feature vector are then compared. A determination is made whether the comparison satisfies a match threshold, and in response to the comparison satisfying the match threshold, the interviewer is selected for a panel.

20 Claims, 9 Drawing Sheets

(56) References Cited

U.S. PATENT DOCUMENTS

| | | | |
|---|---|---|---|
| 8,560,567 B2* | 10/2013 | Azzam | G06F 16/3329 |
| | | | 707/769 |
| 8,856,000 B1* | 10/2014 | Larsen | G06F 17/274 |
| | | | 704/9 |
| 2001/0034011 A1 | 10/2001 | Bouchard | |
| 2013/0024407 A1* | 1/2013 | Thompson | G06F 16/353 |
| | | | 706/12 |
| 2013/0343616 A1* | 12/2013 | Forero | G06K 9/00335 |
| | | | 382/115 |
| 2014/0156356 A1 | 6/2014 | Olivier et al. | |
| 2015/0046357 A1 | 2/2015 | Danson et al. | |
| 2015/0269528 A1* | 9/2015 | Gharote | G06Q 10/1053 |
| | | | 705/321 |
| 2015/0269529 A1 | 9/2015 | Kyllonen et al. | |
| 2015/0278768 A1 | 10/2015 | Boring et al. | |
| 2016/0354024 A1 | 12/2016 | Keshava et al. | |
| 2019/0108215 A1* | 4/2019 | Jaroch | G06F 17/277 |

OTHER PUBLICATIONS

Dattner, B., "A Scorecard for Making Better Hiring Decisions," Harvard Business Review, Feb. 4, 2016, pp. 1-5. https://hbr.org/2016/02/a-scorecard-for-making-better-hiring-decisions.

Grossman, R., "Measuring Hiring Managers," Human Resource Magazine, Jun. 1, 2006, pp. 1-6, SHRM. https://www.shrm.org/hr-today/news/hr-magazine/Pages/0606met_grossman.aspx.

Le et al., "Distributed Representations of Sentences and Documents," ICML '14: Proceedings of the 31st International Conference on Machine Learning, vol. 32, 2014, 9 pages.

Mishra, A., "The Real Cost of Hiring a Single Candidate," Interview Mocha, Blog, Mar. 19, 2015, pp. 1-8. https://blog.interviewmocha.com/the-real-cost-of-hiring-a-single-candidate/.

Sutskever et al., "Sequence to Sequence Learning with Neural Networks," NIPS '14: Proceedings of the 27th International Conference on Neural Information Processing Systems, 2014, pp. 1-9. http://papers.nips.cc/paper/5346-sequence-to-sequence-learning-with-neural.

"Scientific Assessment to Measure English Speaking, Understanding and Listening Skills," Research Articles, aspiringminds.com, printed: Sep. 21, 2017, pp. 1-4. http://www.aspiringminds.com/research-articles/scientific-assessment-to-measure-english-speaking-understanding-and-listening.

"Detecting High Stress in Interviews and Text," NASA Technology, TOP2-147, printed: Sep. 21, 2017, 2 pages. https://technology.nasa.gov/patent/TOP2-147.

"The Most Effective Way to Assess Engineers," Qualified—Automated software skill assessments, printed: Sep. 12, 2017, 1 page. https://www.qualified.io/.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

FEATURE VECTOR PROFILE GENERATION FOR INTERVIEWS

BACKGROUND

Computer systems can be implemented to aid humans through daily tasks. Cognitive computing systems can be configured to collect data from humans through sensors (e.g., via speech and object recognition techniques). The data can then be analyzed and processed to, for example, provide information and recommendations to humans. Example use cases of cognitive computing include speech recognition, sentiment analysis, face detection, risk assessment, fraud detection, and behavioral recommendations.

SUMMARY

Aspects of the present disclosure relate to cognitive interview management. Audio data from an interviewer in an interview can be received. The audio data can be processed by converting the audio data into structured text. The structured text can then be analyzed to identify questions in the structured text. The structured text data can also be analyzed to determine at least one tonal dimension, at least one class dimension, and at least one difficulty dimension. A feature vector can then be generated having the determined dimensions. A reference feature vector can be received having at least one reference tonal dimension, at least one reference class dimension, and at least one reference difficulty dimension. The generated feature vector and reference feature vector are then compared. A determination is made whether the comparison satisfies a match threshold, and in response to the comparison satisfying the match threshold, the interviewer is selected for a panel. The selection can then be transmitted in any manner.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
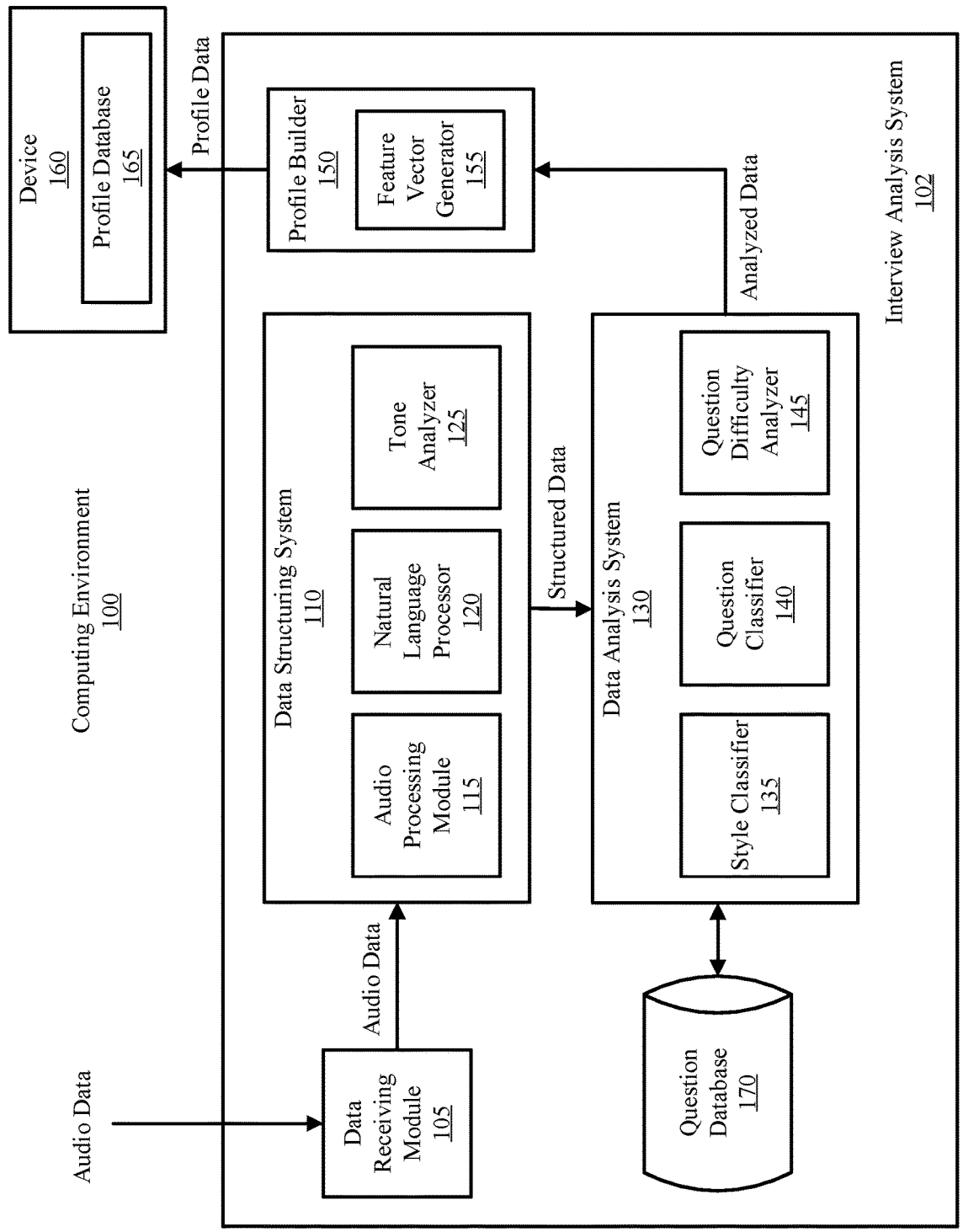
FIG. 1 is a block diagram of a computing environment that can be used to collect, process, and analyze interview data and generate profiles, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the present disclosure.

DETAILED DESCRIPTION

Aspects of the present disclosure relate generally to the field of cognitive computing, and in particular to cognitive computing for interview management. While the present disclosure is not necessarily limited to such applications, various aspects of the disclosure may be appreciated through a discussion of various examples using this context.

The interview process is costly for employers. Interview expenses depend on a variety of factors, including the number of selected interviewers (e.g., individuals administering the interview), the interviewers' incomes (e.g., salary or wage), and the time required for the interview. In many situations, a diverse pool of interviewers may be necessary, as job requirements can include wide-ranging skill sets. For example, in the tech industry, engineers or scientists are typically involved in the interview process, as they possess the skills and/or knowledge relevant to the job requirements. These factors add additional operation cost to the hiring process.

The interview process has additional short comings. For example, the interview process is inconsistent. The interview experience varies significantly depending on the selected interviewers. Further, the interview process exerts a high cognitive load on the interviewers. The interviewers are required to tailor questions specific to the candidates' background, the job requirements, and "on the fly" based on the context of the interview. Additionally, interviewers are also unaware of previously conducted interviews. This can lead to interviewers asking redundant questions throughout the interview, which can reduce the knowledge acquired from the applicant (e.g., candidate, prospective employee, interviewee, etc.) throughout the interview process.

Aspects of the present disclosure can be configured to collect data in real-time from an interview, and use the data to make a variety of decisions in the interview process. For example, the data collected during the interview can be used to generate interviewer profiles which can aid in panel selection for future interviews. The interviewer profiles can characterize the types of questions asked by interviewers, the difficulty of questions asked by interviewers, and the relative tones of the interviewers. Accordingly, a proper composition of interviewers can be selected to match panel selection requirements, which can reduce the number of interviewers on the panel, reduce the selection of panel members with similar credentials/expertise, and eliminate the burden of manually selecting an interviewer panel.

Further, aspects of the present disclosure enable question prompting in real-time during an interview. Based on data obtained in the interview, previous interviews, interviewer profiles, candidate information, job requirements (e.g., interview data) and question requirements, appropriate questions can be prompted to interviewers during the interview. This can reduce the occurrence of interviewers asking repetitive questions during an interview. Further, the questions can be prompted based on a range of question requirements (e.g., tonal requirements, class requirements, difficulty requirements, job requirements, candidate background requirements, etc.). This additionally eliminates cognitive load on the interviewer's behalf, as questions can be automatically prompted.

Additionally, aspects of the present disclosure enable candidate performance prediction. A reinforcement learning model can be supplied with interview data (e.g., candidate information, job requirements, audio data collected during the interview, interviewer profiles, candidate profiles, etc.) in addition to reward signals in order to issue predictive hiring decisions which maximize cumulative reward.

Referring now to the figures, FIG. 1 is a block diagram illustrating an example computing environment 100 in which illustrative embodiments of the present disclosure can be implemented. The computing environment includes an interview analysis system 102 and a device 160. The interview analysis system 102 can be configured to generate interviewer and/or applicant profiles (descriptions containing qualitative and quantitative characteristics for an individual) based on received audio data (e.g., from an interview). The profiles can include information regarding specific individuals based on discussions in the interview. For example, an interviewer profile can include the type and difficulty of questions asked during the interview, in addition to the general tone (e.g., style) of the interviewer. An applicant profile can include the applicant's general tone during the interview and their relative success during the interview (e.g., based on interviewer responses or answer analysis). The profiles can be used for various purposes, including panel selection, question prompting, and performance prediction.

Consistent with various embodiments, the interview analysis system 102 includes a data receiving module 105, data structuring system 110, data analysis system 130, profile builder 150, and question database 170. The data receiving module 105 can be configured to receive audio data. The audio data can be collected from an interview during the hiring process. The audio data can be received in real-time as the audio is produced (e.g., during the interview). However, in some embodiments, the audio data is received after the audio is produced (e.g., from a database including audio recordings). The audio data can include information from an interview. For example, the audio data can include questions asked by the interviewer, responses by the applicant (e.g., interviewee), conversations, or any other audio data captured during the interview. The data receiving module 105 forwards the audio data to a data structuring system 110 for processing.

The data structuring system 110 is configured to process the audio data. The data structuring system includes an audio processing module 115, natural language processor 120, and tone analyzer 125. The audio processing module 115 receives the audio data from the data receiving module 105 and converts the audio into text. Specifically, the audio processing module 115 can be configured to complete speech recognition on the received audio data to convert the audio data into a machine-readable format. This can include detecting characters, words, phrases, sentences, etc. from the audio data and converting the audio data into corresponding text. In some embodiments, the audio processing module 115 converts the audio into an unstructured text format. In some embodiments, the audio processing module 115 converts the audio into a structured text format.

The audio processing module 115 can be configured to differentiate between speakers (e.g., the interviewer and applicant) by analyzing the frequency, pitch, and tone of the audio data. The audio processing module 115 can further be configured to indicate time periods associated with the processed audio data. For example, the audio processing module 115 can time-stamp word or sentences based on the time they were received (e.g., if the audio data is received in real-time). The audio processing module 115 can be configured to associate the speaker with their respective text data.

The textual data output by the audio processing module 115 is then forwarded to the natural language processor 120. The natural language processor 120 can perform various operations to analyze, understand, and derive meaning from the processed audio data. For example, the natural language processor 120 can perform syntactic analysis, semantic analysis, sentiment analysis, tokenization, part of speech (POS) tagging, and the like. Further, the natural language processor 120 can also be configured to format the textual data. The output of the natural language processor 120 can be used to further analyze the data acquired in the interview. For example, the output of the natural language processor 120 can be used to identify questions asked in the interview and compare the identified questions to questions in the question database 170 in order to classify the questions and/or determine the difficulty of the questions asked in the interview. Greater detail regarding the natural language processor 120 is discussed with reference to FIG. 2.

The processed text data output by the natural language processor 120 is then dispatched to the tone analyzer 125. The tone analyzer 125 is configured to complete a tonal analysis of the processed text data. Specifically, the tone analyzer 125 is configured to complete a linguistic analysis to detect emotional and language tones in the processed text data. The tone analyzer 125 can determine emotional and tonal characteristics of specific phrases, sentences, and/or entire passages in the text data. The tone analyzer 125 can tag or otherwise indicate the tone of the specific phrases, sentences, and/or passages. Examples of tones include joy, fear, sadness, anger, analytic, confidence, aggressive, supportive, tentative, etc. The tones can be associated with individuals (e.g., the interviewer/applicant) and timings. The data processed by the data structuring system 110 is then dispatched to the data analysis system 130.

The data analysis system 130 can receive the processed textual data from the data structuring system 110. The data analysis system 130 includes a style classifier 135, question classifier 140, and question difficulty analyzer 145 which can be configured to analyze the textual data in order to build interviewer profiles. In some embodiments, the data analysis system 130 can be configured to analyze text data associated with an applicant, which can be used to make performance predictions and/or hiring decisions.

The style classifier 135 is configured to classify styles (e.g., overall tonal characteristics) for individuals in the interview. In order to classify styles, the style classifier 135 receives the tonal analyses of text from the tone analyzer 125. The style classifier 135 then analyzes the tones for each individual, and classifies a style for each individual based on the frequency and timing of tone occurrences in the analyzed data.

Styles can be classified in any manner. In some embodiments, styles are classified based on n-dimensional feature vectors having any number of individual tones as dimensions. The vector space (e.g., the magnitude and direction of the vector) can then depend on the relative frequency (e.g., occurrence or magnitude) of the tones throughout the interview. For example, if throughout the course of an interview, a given interviewer had a relative tone frequency of 50% happiness, 20% analytic, 25% confidence, and 5% anger, the feature vector could be constructed as a 4 dimension feature vector reflecting the occurrence of each tone (e.g., 0.5, 0.2, 0.25, 0.05). However, in some embodiments, the number of dimensions can already be pre-defined (e.g., "X" tonal dimensions), and the feature vector dimensions can be populated based on the tonal analysis output by the tone analyzer 125 (e.g., with dimensions not observed represented by a zero value). The feature vectors for each individual's style can be stored and updated over time. The magnitudes of the dimensions of the feature vectors can be numerically represented in any manner (e.g., as values, proportions, or percentages). In some embodiments, the feature vector for tonal dimensions is generated by a feature vector generator 155.

In some embodiments, the observed tones for each individual are stored (e.g., in a table), and the styles are classified based predefined classification rules. The style classification rules can be defined in any manner. In some embodiments, the tone with the highest frequency can be classified as the style. In these embodiments, the tone with the highest frequency can be determined (e.g., by analyzing the tonal data), and the style can be classified as the most frequent tone. For example, if a table includes relative tone proportions of 0.4 analytic, 0.2 supportive, 0.3 aggressive, and 0.1 confidence, the style can be classified as "analytic," as it is tone with the highest occurrence for that given individual. In some embodiments, the style is selected based on the three highest frequency tones (e.g., analytic, supportive, aggressive). In some embodiments, the style can mirror the stored tonal data (e.g., 40% analytic, 20% supportive, 30% aggressive, 10% confident). In some embodiments, the tonal data can be compared to a predefined classification threshold, and the style can be classified based on individual tones satisfying the predefined classification threshold. Following the example above, if a predefined classification threshold is 25% (e.g., the tonal data must have a frequency of at least 25% in order to satisfy the threshold), the style can be classified as analytic and aggressive, as the frequency of these two tones each exceed the 25% threshold.

Consistent with embodiments, the style can represent multiple tonal dimensions. For example, if the tones observed for an individual are "intense" and "unpleasant," the style could be classified as "aggressive" (e.g., aggressive is a combination of intense and unpleasant). Likewise, if the tones of observed for an individual are "unpleasant" and "mild," the style could be classified as "dull" (e.g., dull is a combination of unpleasant and mild). Similar style classifications can be completed for feature vectors generated based on tonal dimensions. In these embodiments, a single style classification can be defined based on the vector space. However, any number of tonal dimensions can be considered and classified into any number of styles for a given individual. The style classifier 135 can classify tones in any other suitable manner otherwise consistent herein. The styles generated by the style classifier 135 can be transmitted to the profile builder 150.

The question classifier 140 can be configured to determine the class of questions asked during the interview. The question classifier 140 first receives structured textual data from the data structuring system 110. The structured textual data can include questions asked during the interview, as indicated by the natural language processor (e.g., based on machine learning or predefined rules). The question classifier 140 then determines the classification of the questions. In some embodiments, the question classifications are determined by comparison to other data. For example, the question classifier 140 can be configured to compare the questions asked during the interview to questions in the question database 170. The question database 170 may include a large volume of questions organized into predetermined classifications. The question classifier 140 can then map the question asked in the interview to a question in the question database 170, and determine the classification based on classification of the question in the database.

In some embodiments, the question classification can be determined based on comparison to a classification repository. For example, the question classifier 140 may be configured to map characters, words, phrases, or sentences in each question to corresponding elements in the classification repository. The classification repository can include classification tables with corresponding words or phrases that correspond to the classification. For example, for the class "biology", keywords in the biochemistry classification table could include "DNA," "ribosomes," "polypeptides," "mitochondria," "enzymes," etc. As another example for a classification "computer hardware," keywords in the computer hardware classification table could include "processor," "DRAM," "SRAM," "motherboard," "solid state drive," "monitor," etc. Following the example above, if a question asked in the interview was "Can you explain the difference between SRAM and DRAM?", the question classifier 140 would identify that the acronyms "SRAM" and "DRAM" match keywords located in the "computer hardware" classification. The question classifier 140 would then classify the question as belonging to the "computer hardware" classification.

In some embodiments, question classes are manually defined (e.g., by the interviewer or applicant answering the questions). In these embodiments, the classifications can be provided to the question classifier 140. After the classifications are determined by, or provided to, the question classifier 140, the question classifications are dispatched to the profile builder 150, so the question classifications can be used to generate profiles based on the question classifications.

The question difficulty analyzer 145 can be configured to determine the relative difficulty (e.g., difficulty value, difficulty rating, difficulty level, etc.) of questions asked in the interview. To do so, the question difficulty analyzer 145 first receives a question or set of questions (e.g., asked during the interview) from the data structuring system 110. The question difficulty analyzer 145 then determines the difficulty of the question(s). The difficulty of questions can be determined in any manner. In some embodiments, the question difficulty is determined by comparison to other data. For example, the question difficulty analyzer 145 can be configured to compare the questions received from the data structuring system 110 to questions in the question database 170. The question database 170 may include a volume of questions with predetermined difficulty values. The question difficulty analyzer 145 can be configured to map each question to a question in the question database 170. For each mapping, the question difficulty analyzer 145 can determine the difficulty based on the questions in the database 170. For example, if a question in the database has a difficulty level of 50% (e.g., intermediate difficulty), and the question in the interview was mapped to the 50% difficulty level question, the question difficulty analyzer 145 can determine that the difficulty of the question in the interview is 50%.

In some embodiments, the question difficulty can be based on the question class. For example, a question classified as "computer hardware" can have a relatively higher difficulty value than a question classified as "behavioral." In some embodiments, the question difficulty can be determined based on feedback. In these embodiments, the question difficulty can be determined by an individual (e.g., or group of individuals), and the feedback can be provided to the question difficulty analyzer 145. In some embodiments, the question difficulty can depend on applicant information (e.g., a resume, a curriculum vitae (CV), a cover letter, etc.). In these embodiments, the question difficulty can depend on the expertise of the applicant. For example, an applicant with a Ph.D. in mathematics can have a lower relative difficulty value for a set of mathematics based questions than an applicant with no background in mathematics for the same set of mathematics based questions. The question difficulty can be normalized based on class, feedback, and/or applicant backgrounds.

After the data received by the data analysis system 130 is processed by the style classifier 135, question classifier 140, and question difficulty analyzer 145, the analyzed data is dispatched to the profile builder 150. The profile builder 150 can be configured to generate an interviewer profile for each interviewer on a panel. The interviewer profile can include the style of the interviewer, the class of questions asked by the interviewer, and the difficulty of questions asked by the interviewer.

The profile builder 150 can also be configured to generate profiles for the applicants (e.g., interviewees or candidates). The applicant profiles can include background information (e.g., resumes, CV's, cover letters, writing samples, etc.), styles (e.g., based on responses to questions), and relative success during the interview (e.g., based on ratings of the applicant or analysis by the data analysis system 130).

In some embodiments, the profile builder 150 is configured to store all of the data acquired from the data analysis system in a table, and populate the table with the analyzed data acquired from the data analysis system 130. The profile builder 150 can be configured to statistically analyze the data received by the data analysis system. For example, the profile builder can generate relative percentages for questions regarding class and difficulty (e.g., 30% behavioral, 20% software, 20% networks, 30% storage for class and 25% easy, 50% intermediate, and 25% difficult for difficulty). The table can then be used for future interview considerations (e.g., question prompting, panel selection, decision making, etc.).

In some embodiments the profile builder includes a feature vector generator 155 configured to generate a feature vector for each individual's profile. Each feature vector can include any number of dimensions (e.g., hundreds or thousands of dimensions) for each individual, and can be used for comparison to other data to aid the interview process. As an example, the feature vector generator 155 can include dimensions for the style (e.g., specific tones such as supportive, aggressive, analytic, confident, etc.), dimensions for classes (e.g., software, hardware, biology, chemistry, behavioral, administrative, etc.), and dimensions for the question difficulty (e.g., easy, intermediate, difficult, etc.). The total feature vector can include magnitudes of each dimension, which can be numerically represented in any manner. In some embodiments, the feature vectors are normalized such that the feature vectors are easily comparable.

The profile builder 150 then transmits the profile data (e.g., which can include table and/or feature vector representations of the interview data) to the device 160, where the profile can be stored in a profile database 165. The profile database 165 can include all of the profiles analyzed and generated by the interview analysis system 102.

While FIG. 1 illustrates a computing environment 100 with a single interview analysis system 102 and device 160, suitable computing environments for implementing embodiments of this disclosure can include any number of systems 102 and/or devices 160. The various models, modules, systems, and components illustrated in FIG. 1 can exist across a plurality of systems 102 and devices 160. For example, some embodiments can include two devices. The two devices can be communicatively coupled using any suitable communications connection (e.g., using a WAN, a LAN, a wired connection, an intranet, or the Internet). Further, in some embodiments, the question database 170 and profile database 165 can be stored across a plurality of systems and/or devices. In some embodiments, the data structuring system 110 and data analysis system 130 can be included in separate systems.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in some embodiments, the natural language processor 120 can be configured to process audio data (e.g., convert the audio data into a structured textual format) and analyze tones. In these embodiments, the data structuring system 110 may only include the natural language processor 120. In some embodiments, the data analysis system 130 can include various additional analyzation components. For example, the data analysis system 130 can include an applicant analyzation component configured to analyze an applicant's background information and determine relative success of the applicant during the interview (e.g., based on responses provided during the interview). However, the configuration of the computing environment 100 can vary, and the disclosure is not limited to any particular arrangement described.

Figure 2:
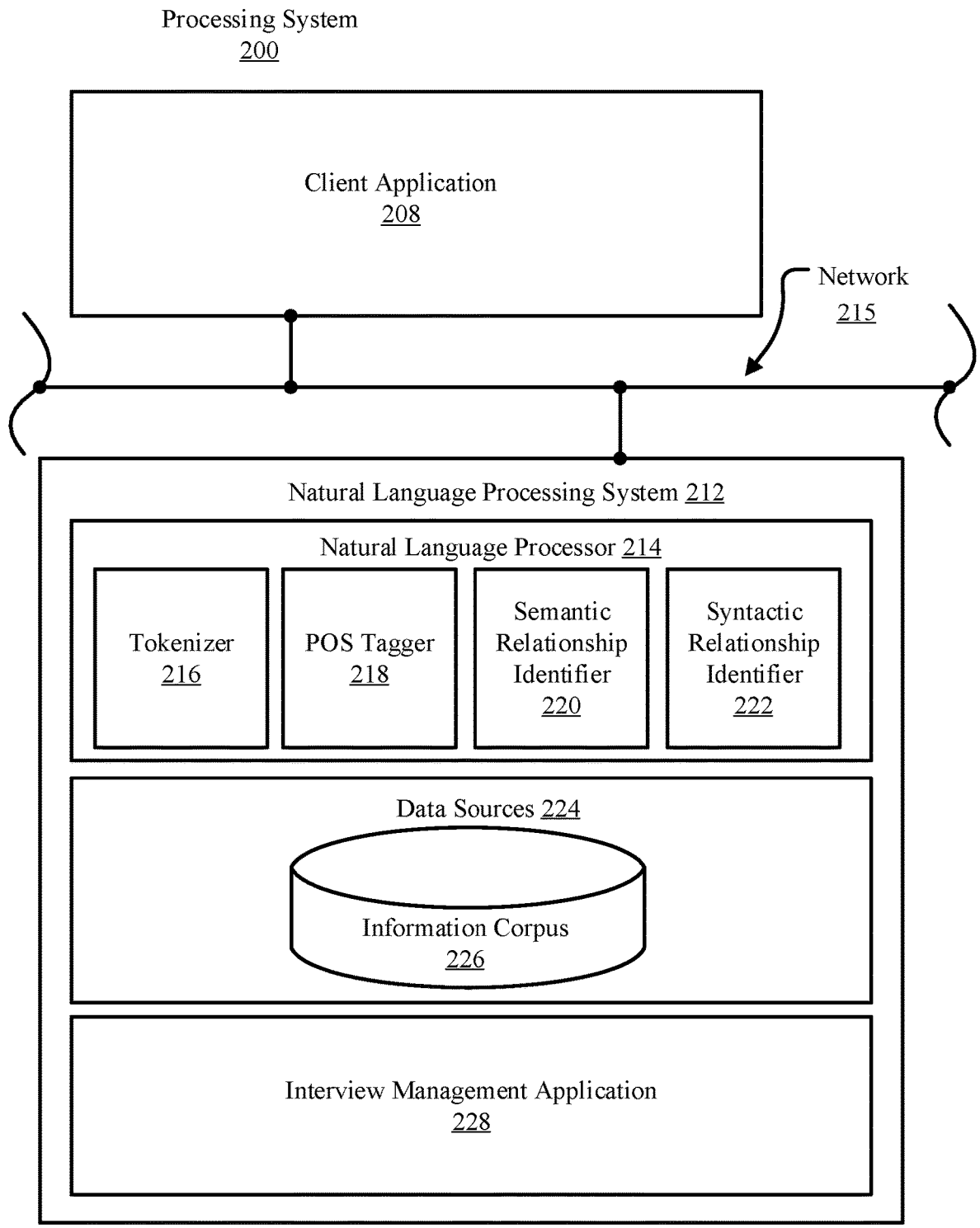
FIG. 2 is a block diagram of a natural language processing system, in accordance with embodiments of the present disclosure.

Turning now to FIG. 2, illustrated is a block diagram of an example natural language processing system 200 configured to process unstructured data inputs (e.g., unstructured text documents converted from audio data), in accordance with embodiments of the present disclosure. In some embodiments, a remote device (e.g., device 160) can submit input data to be analyzed by the natural language processing system 212, which can be a standalone device, or part of a larger computer system. Such a processing system 200 can include a client application 208, which can itself involve one or more entities operable to generate or modify unstructured input data that is then dispatched to a natural language processing system 212 via a network 215.

Consistent with various embodiments, the natural language processing system 212 can respond to electronic document submissions sent by the client application 208 (e.g., audio data received during an interview and processed by the audio processing module 115 into a text format). Specifically, the natural language processing system 212 can analyze a received unstructured data input (e.g., data received from audio processing module 115 of FIG. 1) and prepare the unstructured data input for analysis (e.g., tonal analysis, question class analysis, difficulty analysis, etc). The natural language processing system 212 includes a natural language processor 214, data sources 224, and an interview management application 228.

The natural language processor 214 (e.g., natural language processor 120 of FIG. 1) can be a computer module that analyzes the received unstructured input data from data sources 224. The data sources 224 can be the same or substantially similar to the processed audio data received from the audio processing module 115 in FIG. 1. The data sources 224 can further include profile history data for individuals (e.g., received from device 160 of FIG. 1) and data regarding applicant backgrounds (e.g., resumes and CV's). In some embodiments, the data sources 224 can include an information corpus 226. The information corpus 226 can enable data storage and retrieval. In some embodiments, the information corpus 226 may be a storage mechanism that houses a standardized, consistent, clean, and integrated list of data.

The natural language processor 214 can perform various methods and techniques for analyzing electronic documents (e.g., syntactic analysis, semantic analysis, personal name recognition, etc.). The natural language processor 214 can be configured to recognize and analyze any number of natural languages. In some embodiments, the natural language processor 214 can parse passages of the documents (e.g., words, phrases, or sentences). Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and can break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can ingest a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple-store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

The output of natural language processor 214 can be dispatched to the interview management application 228 (e.g., which can include various components depicted in FIG. 1) and be used for various analyses, such as tone analyzation, style classification, question classification, and question difficulty analyzation. For example, the natural language processor 214 can be configured to structure the audio data for tonal analysis (e.g., by tone analyzer 125 of FIG. 1). This can include formatting the data into a form readable by a tone analyzer. The natural language processor can also be configured to identify specific questions asked during the interview, such that the characteristics of the questions can be analyzed. In some embodiments, determining questions can be rule-based. For example, the natural language processor 120 can be configured to indicate questions based on the context of the interview, such as transitional phrases (e.g., "moving on" or "next question") or question indicators ("Who", "What", "Where", "How", and "When"). In some embodiments, questions can be identified with machine learning techniques (e.g., sequence-to-sequence neural networks). In these embodiments, question identification can be supervised (e.g., based on feedback provided by an individual) or unsupervised (e.g., using clustering techniques).

Figure 3:
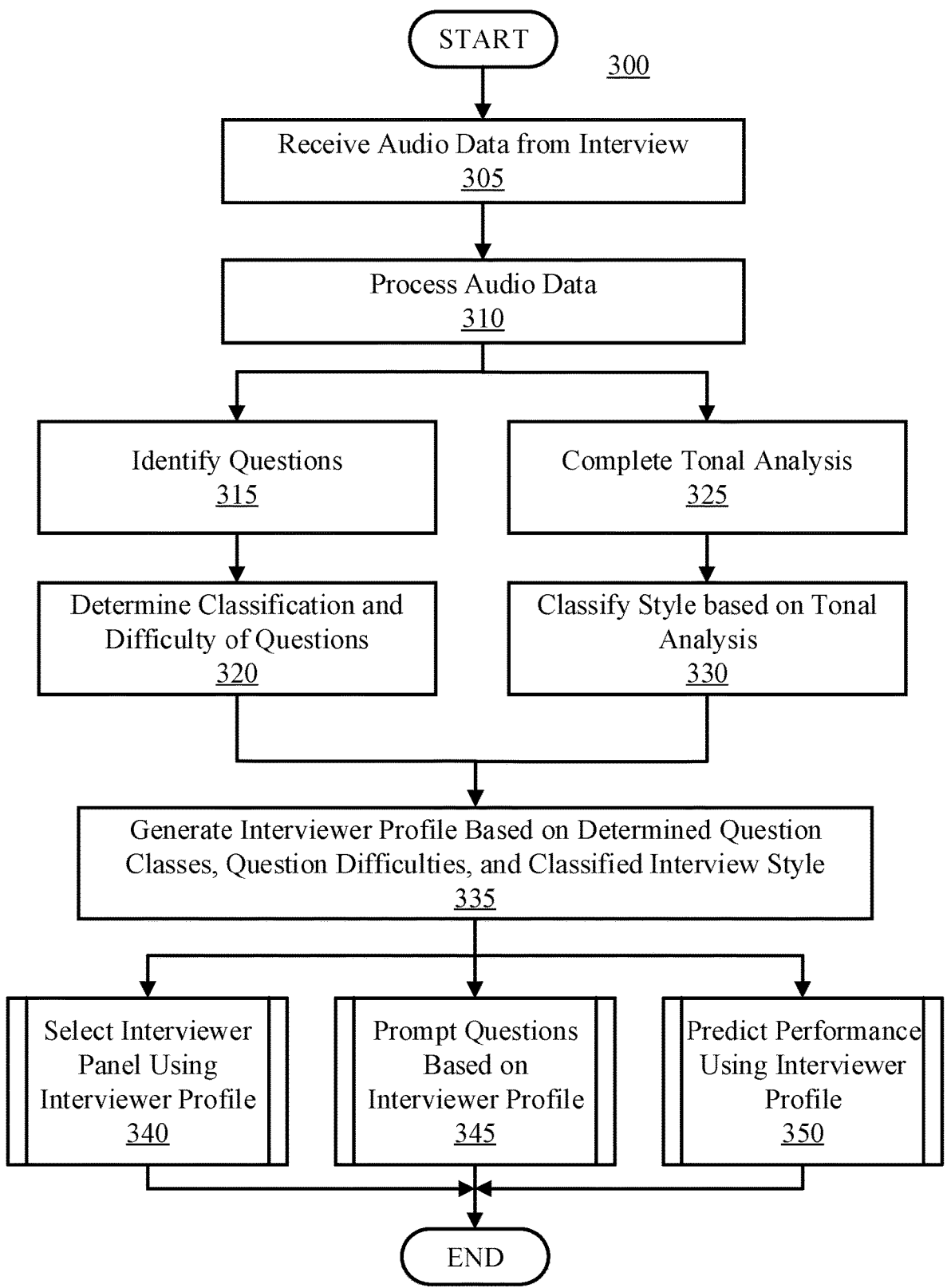
FIG. 3 is a flow diagram illustrating a process for building a profile and using the profile for future interview considerations, in accordance with embodiments of the present disclosure.

Referring now to FIG. 3, shown is a flow diagram illustrating an example process 300 for generating an interviewer profile and using the interviewer profile for various interview considerations. Process 300 starts where audio data is received from an interview. This is illustrated at step 305. Audio data can be received in real-time while the interview is occurring. In some embodiments, however, audio data can be received at a later time (e.g., from a database including audio files).

The audio data is then processed. This is illustrated at step 310. Processing at step 310 can include converting the audio data to text, structuring the text, and analyzing the text. The processing at operation 310 can include various analysis completed by a natural language processor (e.g., natural language processor 120 of FIG. 1 or natural language processor 214 of FIG. 2), including semantic analysis, syntactic analysis, part of speech (POS) tagging, tokenization, and the like.

The structured text data is then analyzed to determine questions in the text. This is illustrated at step 315. Questions can be determined based on predetermined rules (e.g., translational phrases and/or question indicators). In some embodiments, questions can be determined based on machine learning techniques (e.g., supervised or unsupervised machine learning). In some embodiments, questions can be indicated by a user, and the questions can be identified in response to receiving the indication.

The classification and difficulty of the questions are then determined. This is illustrated at step 320. The class and difficulty of questions can be determined by comparison to other data. For example, the questions can be compared to questions with predetermined classifications and difficulty values in a question database. Based on the comparison, the classification and difficulty of the questions can be determined. In some embodiments, the classification and difficulty of questions are determined based on provided feedback. However, the classification and difficulty of questions can be determined in any other suitable manner.

Further, after the audio data is processed at step 310, a tonal analysis of the processed text data can be completed. This is illustrated at step 325. The tonal analysis can indicate tones (e.g., sad, angry, joyful, aggressive, analytic, confident, etc.) of the structured text data at specific passages. By analyzing tones of specific passages, the relative temporal period of the tones can be established. The identified tone occurrences can be statistically processed and compiled into a table or other form for convenient tonal analysis. The tones can then be used to classify a general style of the interviewer at step 330. The style can be classified based on a multi-dimensional feature vector. In some embodiments, the style is classified based on the vector space of the feature vector having multiple tonal dimensions. In some embodiments, the style can be classified based on a statistical analysis of the tones (e.g., relative percentages of each tone over time, the number of tones, the temporal period of tones, etc.). In these embodiments, predetermined rules can be used to classify the style (e.g., the most occurring tone, the tones exceeding a predetermined threshold, tone occurrences at specific times, etc.).

The determined question classifications, question difficulties, and interview style are then used to generate an interviewer profile. This is illustrated at step 335. The profile can indicate the characteristics for an interviewer (e.g., what types of questions the interviewer asks, how hard the questions are, the tone the interviewer has during the interview, etc.). In some embodiments, the profile is represented by a multidimensional feature vector. In these embodiments, dimensions of the feature vector can include classification dimensions, difficulty dimensions, and tonal dimensions (e.g., style dimensions). In some embodiments, a table can be generated for the profile having various class, difficulty, and tonal characteristics. Generating the profile at step 335 can include statistically analyzing the class, difficulty, and style data and organizing the data into a standardized, consistent, clean, and integrated list of data.

Figure 5:
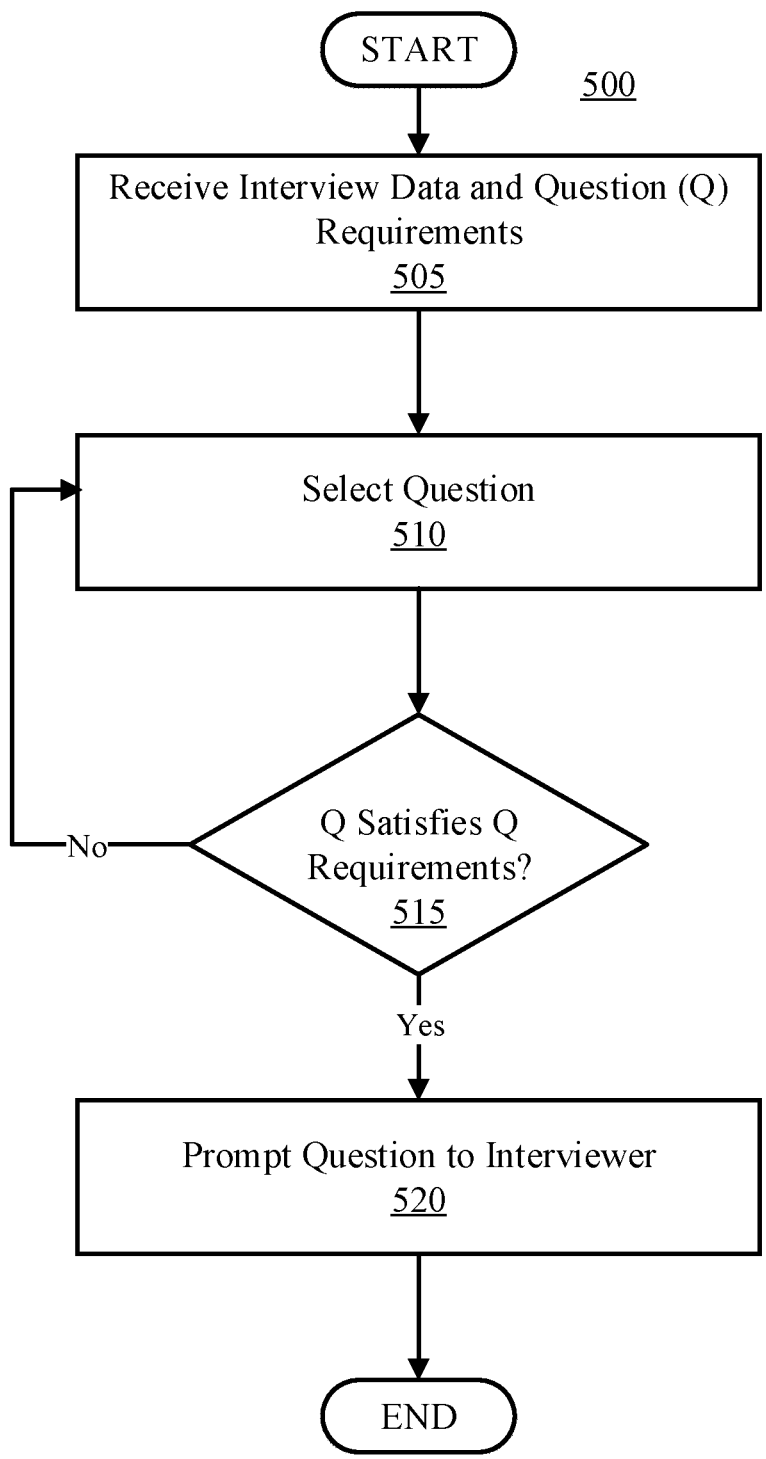
FIG. 5 is a flow diagram illustrating question prompting based on collected interview data and question requirements, in accordance with embodiments of the present disclosure.
Figure 6:
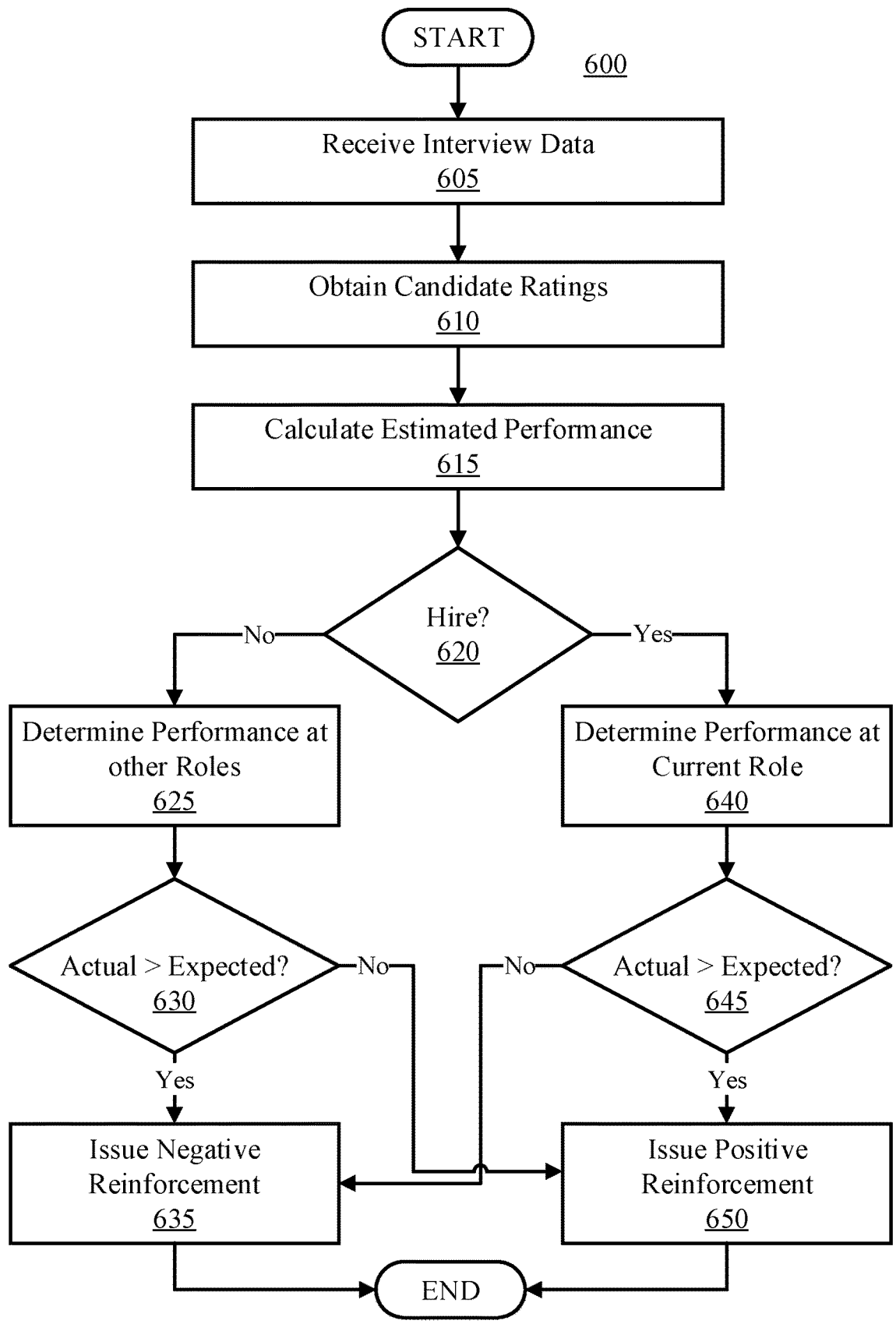
FIG. 6 is a flow diagram illustrating candidate performance prediction using reinforcement learning, in accordance with embodiments of the present disclosure.

The profile can then be used for various interview considerations (e.g., illustrated at steps 340-350). For example, the profile can be used to select interviewers for future interviews. This is illustrated at sub-process 340. The profile can also be considered when prompting questions in the current interview and/or future interviews. This is illustrated at sub-process 345. The profile can also be used for applicant performance predictions. This is illustrated at sub-process 350. Steps 340-350 are sub-processes which include additional steps that are described in greater detail with regard to FIG. 4-6. Specifically, sub-process 340 is illustrated in FIG. 4, sub-process 345 is illustrated in FIG. 5, and sub-process 350 is illustrated in FIG. 6.

Figure 4:
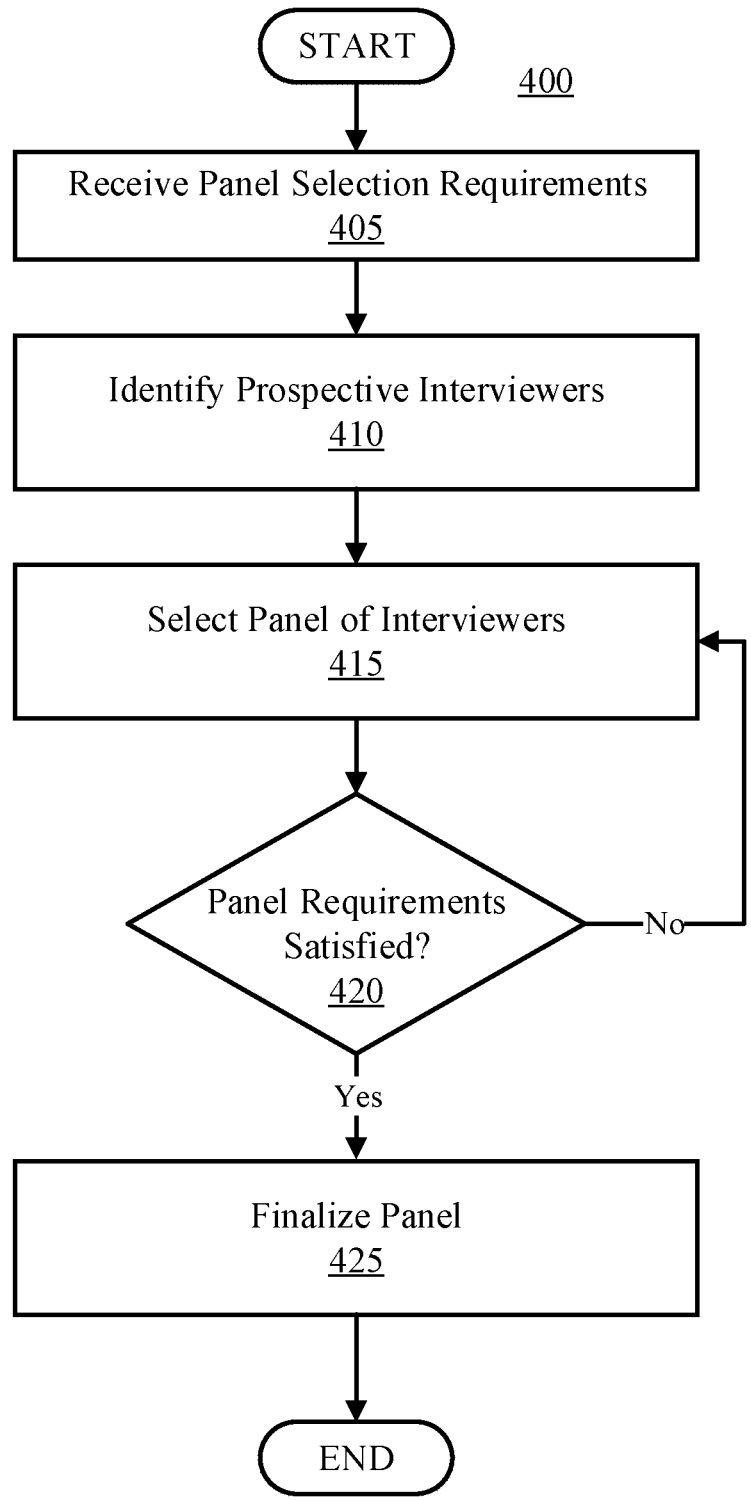
FIG. 4 is a flow diagram illustrating interview panel selection using interviewer profiles, in accordance with embodiments of the present disclosure.

Referring now to FIG. 4, shown is an example process 400 for selecting an interview panel using interview profiles (e.g., which can be obtained via process 300 of FIG. 3). Process 400 begins by receiving panel selection requirements. This is illustrated at step 405. Panel selection requirements can include specific question class requirements, question difficulty requirements, and interviewer style requirements. The panel selection requirements can be based on candidate background information, job requirements, or manually defined requirements (e.g., as defined by a human resources manager). The panel selection requirements can be represented as threshold values, which can include upper limits, lower limits, or ranges.

In some embodiments, the selection requirements are represented as a multidimensional feature vector having question class dimensions, question difficulty dimensions, and tonal dimensions. The panel requirement feature vector (e.g., reference vector) can then be used to select interviewers. The panel requirement feature vector dimensions can include limits or ranges for accepted values.

In some embodiments, the selection requirements can be represented in a table, with specific class requirements, difficulty requirements, and tonal requirements. The profiles for each interviewer can then be compared to the table of requirements to select the panel of interviewers. In some embodiments, panel selection requirements can specify specific interviewers that are required to be a member of the panel. In some embodiments, the panel selection requirements specify a number of interviewers, in addition to the time required for the interview.

Prospective interviews are then identified. This is illustrated at step 410. In some embodiments, a pool of interviewers can be automatically selected from a profile database (e.g., profile database 165 of FIG. 1). Prospective interviewers can be selected based on availability of interviewers, technical fields, panel requirements, or any other considerations.

A panel of interviewers is then selected from the prospective interviewers. This is illustrated at step 415. The initial selection of the panel can be determined in any manner. In some embodiments, the panel is selected based on the panel selection requirements. For example, the number of members on the panel can be selected to match a number of members defined in the panel selection requirements.

In some embodiments, the panel is selected based on one or more thresholds. For example, each interviewer can be compared to various threshold (e.g., classification thresholds, difficulty thresholds, and style thresholds) and the interviewers can be selected in response to satisfying the various thresholds. The thresholds can include upper limits, lower limits, or ranges of acceptable values.

In some embodiments, the panel is selected based on a panel requirement feature vector (e.g., reference feature vector). As discussed above, the reference feature vector can include various panel selection dimensions and be used for panel selection determinations. In some embodiments, feature vectors for each interviewer profile can be compared to the reference feature vector, and based on the comparison, the panel can be selected (e.g., for a reference vector with lower limit threshold dimensions: 0.50 analytic (style), 0.50 computer software (class), and 0.75 difficulty, each panel member must meet these thresholds). In some embodiments, the summation of feature vectors for each interviewer can be collectively considered and compared to the reference feature vector (e.g., for a reference vector with lower limit threshold dimensions: 0.50 analytic (style), 0.50 computer software (class), and 0.75 difficulty, the summation of the panel must meet these thresholds).

In some embodiments, the panel is randomly selected (e.g., interviewers are randomly chosen from a list of prospective interviewers). In some embodiments, the initial panel can be manually selected.

A determination is then made whether the selected panel satisfies the panel requirements. This is illustrated at step 420. Determining whether the selected panel satisfies the panel requirements can be based on a threshold comparison. The threshold(s) can represent specific characteristics of the panel requirements. For example, there may be threshold limits for styles (e.g., tonal magnitudes), question difficulties, and/or question classifications compositions on the panel.

In some embodiments, determining that the selected panel satisfies panel requirements can include ensuring that individual feature vectors or summations of feature vectors for interviewers sufficiently match (e.g., based on one or more thresholds) a reference feature vector representing panel requirements. In some embodiments, determining that the selected panel satisfies panel requirements can include comparing profile data (e.g., class, difficulty, and style data) for each interviewer to predetermined thresholds, and in response to satisfying the predetermined thresholds, determining that the panel requirements are satisfied. In some embodiments, the selected panel can collectively be considered and compared to predetermined panel selection thresholds, and in response to satisfying the predetermined thresholds, determining that the panel requirements are satisfied.

If a determination is made that the panel requirements are satisfied, the panel is finalized (e.g., the panel composition is locked in). This is illustrated at step 425. If the panel requirements are not satisfied, then step 420 moves back to step 415, where a new panel of interviewers is selected based on the interviewer profiles and panel selection requirements. The finalized panel can then be transmitted to one or more users (e.g., or devices). In some embodiments, the panel selection can be displayed on a graphical user interface (GUI). In some embodiments, the selected panel can be transmitted to each interview on the panel, in addition to interview managers (e.g., human resources).

FIG. 5 is a flow diagram illustrating an example process 500 for prompting questions to interviewers, in accordance with embodiments of the present disclosure. Process 500 begins at step 505, where interview data and question requirements are received. Interview data can include profile data (e.g., applicant and interviewer profile data), data received from the interview (e.g., conversations during the interview), candidate background information (e.g., a resume, social media profiles, CV's, etc.), job requirements (e.g., qualifications and skills necessary for the job), and any other data acquired through the hiring process. In some embodiments, interview data is received in real-time (e.g., from conversations in the interview). In some embodiments, interview data is received at a later time (e.g., from a database containing applicant information, job postings, etc.).

Question requirements can include limitations on the questions to be asked in the interview. In some embodiments, question requirements can depend on question classes, question difficulty, and/or tonal requirements. The question requirements can include combinational restrictions (e.g., hard difficulty/software class, analytic style/behavioral class, intermediate difficulty/administrative class, etc.). In some embodiments, question requirements can depend on any other acquired interview data (e.g., job requirements, candidate background information, etc.).

In some embodiments, question requirements can indicate that specific questions are prohibited. For example, question requirements can prohibit redundant questions. This can prevent the interviewer from asking a similar question to what was previously asked (e.g., by another interviewer). As another example, specific question classifications or difficulty values can be prohibited. In some embodiments, questions can be prohibited by applying upper limit thresholds on class, difficulty, and tonal dimensions. In some embodiments, question requirements can depend on applicant responses (e.g., if an applicant answered an intermediate difficulty question with ease, a harder difficulty level may be prompted). In some embodiments, question requirements can be represented by a reference feature vector. For example, receiving question requirements can include receiving a feature vector having threshold class, difficulty, and/or style requirements (e.g., as lower limits, upper limits, or ranges).

A question is then selected. This is illustrated at step 510. The question can be selected in any manner. In some embodiments, the question is selected randomly based on a predetermined list of questions. In some embodiments, the question is selected based on the context of the interview (e.g., the temporal period, the previous question, the current conversations, etc.). In some embodiments, questions are selected based on question requirements obtained at step 505. For example, the question can be selected based on specific job requirements indicated in the interview data. In some embodiments, the question is selected based on interviewer profile data (e.g., question classes, difficulties, and styles indicated in the profile). In some embodiments, questions are selected based on candidate background information. However, the question can be selected in any other manner.

A determination is then made whether the question satisfies the question requirements. This is illustrated at step 515. This can include determining whether characteristics of the selected question satisfy the question requirements. For example, if question requirements specify a classification requirement, the selected question only satisfies the requirement in response to falling within the required classification.

In some embodiments, the determination can be made based on a threshold specified in the question requirements. For example, if a question requirement specifies that the question must possess a difficulty rating of at least 50% (e.g., a lower limit), the selected question only satisfies the question requirements in response to possessing a difficulty value of at least 50%. As another example, if question requirements specify that a selected question is required to have a behavioral classification with up to a 50% difficulty rating (e.g., an upper limit), then the selected question is required to be a behavioral question with no more than a 50% difficulty rating.

In some embodiments, determining that the question satisfies the question requirements includes generating a feature vector for the selected question and comparing it to a reference feature vector which represents the question requirements. The reference vector can include threshold magnitude values for each dimension. The thresholds can be upper limits, lower limits, or ranges (e.g., including a lower and upper limit). As an example, a 4-dimensional reference feature vector can include the following dimensional range thresholds: 0.2-0.6 analytic tone, 0.2-0.4 aggressive, 0.5-1.0 software, and 0.25-0.75 difficulty (e.g., 0.2-0.6, 0.2-0.4, 0.5-1.0, 0.25-0.75). Accordingly, a question with a generated feature vector of: (0.4, 0.3, 0.75, 0.50) would satisfy the question requirements, while a question with a generated feature vector (0.1, 0.3, 0.75, 0.50) would fail the question requirements. However, in some embodiments, question requirements can specify that only specific number of dimensions are required to match the requirements (e.g., only three of the four dimensions must be satisfied). In this example, (0.1, 0.3, 0.75, 0.50) would pass the question requirements, as three of the four dimensional threshold ranges are satisfied. However, comparisons between generated feature vectors can be completed in any manner (e.g., based on any predefined rules) to determine whether the selected question satisfies the question requirements. In response to the selected question satisfying the reference feature vector requirements, a determination can be made that the question satisfies the question requirements.

If a determination is made that the question satisfies the question requirements, process 500 proceeds to step 520, where the question is prompted to the interviewer. If a determination is made that the question does not satisfy the question requirements, then process 500 moves back to step 510, where another question is selected.

The question can be prompted to the interviewer in any manner at step 520. In some embodiments, the question is displayed on a graphical user interface (GUI). In some embodiments, the question is converted into speech and played to the interviewer. In some embodiments, the question is transmitted to the interviewer over a network (e.g., to an email account). In some embodiments, the question can be prompted to the interviewee (e.g., candidate or applicant) rather than the interviewer.

Referring now to FIG. 6, shown is an example process 600 for candidate performance prediction, in accordance with embodiments of the present disclosure. Process 600 starts at operation 605, where interview data is received. Interview data can include profile data (e.g., applicant and interviewer profile data), data received from the interview (e.g., conversations during the interview), candidate background information (e.g., a resume, social media profiles, CV's, etc.), job requirements (e.g., qualifications and skills necessary for the job), and any other data acquired through the hiring process. In some embodiments, interview data is received in real-time (e.g., from conversations in the interview). In some embodiments, interview data is received at a later time (e.g., from a database containing applicant information, job postings, etc.).

Candidate ratings are then obtained. This is illustrated at step 610. Candidate ratings can be obtained in any manner. In some embodiments, candidate ratings are calculated based on analysis of audio data received during the interview (e.g., by data analysis system 130 of FIG. 1). In some embodiments, candidate ratings are determined by interviewers, and candidate ratings are provided to the system by the interviewers. However, candidate ratings can be obtained in any other manner. The ratings can be based on a multi-dimensional analysis. For example, the ratings system can include various categories such as "Technical Abilities," "Leadership Skills," "Interpersonal Skills," "Presentation Skills," and "Organization." Each category can include a score (e.g., "1-10) which can be determined by interviewers or automatically by the system based on received audio data.

In some embodiments, the candidate ratings are normalized. For example, candidate ratings can vary as some interviewers may be more "tolerant" and accordingly provide higher ratings on average. To mitigate this issue, in some embodiments, the ratings provided by each interviewer can be subtracted by the average of their ratings over time. As an example, if a first interviewer provides ratings 4, 5, 3, 4, 5 and the first interviewer gives a current rating of 5, the normalized rating calculation would be current rating—average of previous ratings, which would yield=5-4.2=0.8 for the normalized rating. If a second interviewer provides ratings 2, 3, 2, 1, 2 and the second interviewer gives a current rating of 3, the normalized rating would be 3 2=1.0. If different rating scales are used by different interviewers (e.g., 1-10 vs. 1-15), the ratings can be normalized to a common scale. For example, the ratings of each interviewer can be divided by the variance of their ratings in order to normalize the candidate ratings.

An estimated performance is then calculated. This is illustrated at step 615. The performance prediction calculation can be completed by a machine learning module via reinforcement learning (e.g., unsupervised learning). The calculation can include maximizing reward acquired by hiring decisions by comparison between the estimated and actual performance. Estimating the performance can be based on the job requirements, the candidate background information (e.g., how the candidates requisites compare to the job requirements), the interviewer profiles (e.g., how difficult the interviewers were, what type of questions they asked, the overall tone of the interviewers), responses provided by the applicant (e.g., whether they were accurate or not, the tone of the responses, the response time, etc.), the ratings provided to the system (e.g., which indicate the overall success of the applicant through the interview process), and historical reinforcement data received (e.g., based on actual performance of candidates compared to their expected performance). By fine tuning the performance prediction calculations based on a variety of interview data, decision making in the hiring process can be made more accurate. In some embodiments, weightings for interview data (e.g., candidate ratings can be weighted higher than applicant information) are considered to estimate performance.

A determination is then made whether to hire the candidate. This is illustrated at step 620. The determination can be based on the calculated estimated performance. For example, a determination to hire an applicant can be completed in response to the estimated performance exceeding a hiring threshold. If a determination is made to hire the candidate, process 600 proceeds to step 640, where a performance rating is determined. If a determination is made to not hire the candidate, process 600 proceeds to step 625, where candidate performance at other roles is determined.

Determining candidate performance at other roles at step 625 at can be completed in any manner. For example, candidate performance data can be obtained from the internet. In some embodiments, social media archives (e.g., LinkedIn®) can be collected and performance can be determined based on data included in the social media archives. For example, job performance can be collected by gleaning job summaries from the applicant (e.g., achieved 150% sales Q1, generated $200,000 in revenue, etc.). The actual performance can be normalized to a scale consistent with the estimated performance for convenient comparison (e.g., if technical ability was indicated in the rating system, the technical ability at the new position can be determined).

The actual performance at other roles is then compared to the expected performance calculated at step 615 to determine whether the actual performance exceeds the expected performance. This is illustrated at step 630. If the actual performance exceeds the expected performance, negative reinforcement is issued to the performance predictor. This is illustrated at step 635. If the actual performance falls below the expected performance, positive reinforcement is issued to the performance predictor. This is illustrated at step 650. Issuing positive and negative reinforcement can include transmitting signals to the performance predictor which indicate the reward acquired by the action taken (e.g., hire or not hire). If the candidate was not hired, and they perform better than expected, no (or low) reward is acquired by the action, and thus negative reinforcement is issued. Conversely, if the candidate was not hired and performs worse than expected, high reward is acquired by the action.

If a determination is made to hire the applicant, job performance at the current role (e.g., the position the applicant as hired for) is determined. This is illustrated at step 640. The actual performance can be obtained in any manner. In some embodiments, a new candidate rating is generated for the hired candidate after a predetermined amount of time. The new candidate rating can be scored in the same manner as in step 610. For example, if the rating system includes categories such as "Technical Abilities," "Leadership Skills," "Interpersonal Skills," "Presentation Skills," and "Organization" for estimated performance predictions, the same categories can be re-scored based on the hired candidates actual performance. Similar rating scales, normalization, and weightings can also be applied. Calculating the actual performance can be based on job requirements (e.g., quotas), observations (e.g., interpersonal skills and presentations), revenue, or any other performance factor.

A determination is made whether the actual performance at the current role exceeds the expected performance. This is illustrated at step 645. If the actual performance exceeds the expected performance, positive reinforcement is issued, as the decision to hire was rewarding based on the actual performance. This is illustrated at step 650. If the actual performance is not greater than the expected performance, negative reinforcement is provided to the performance predictor. This is illustrated at step 635. The reinforcement system can then be fine-tuned using the reinforcement feedback provided to the system based on actions taken in the hiring process.

Figure 7:
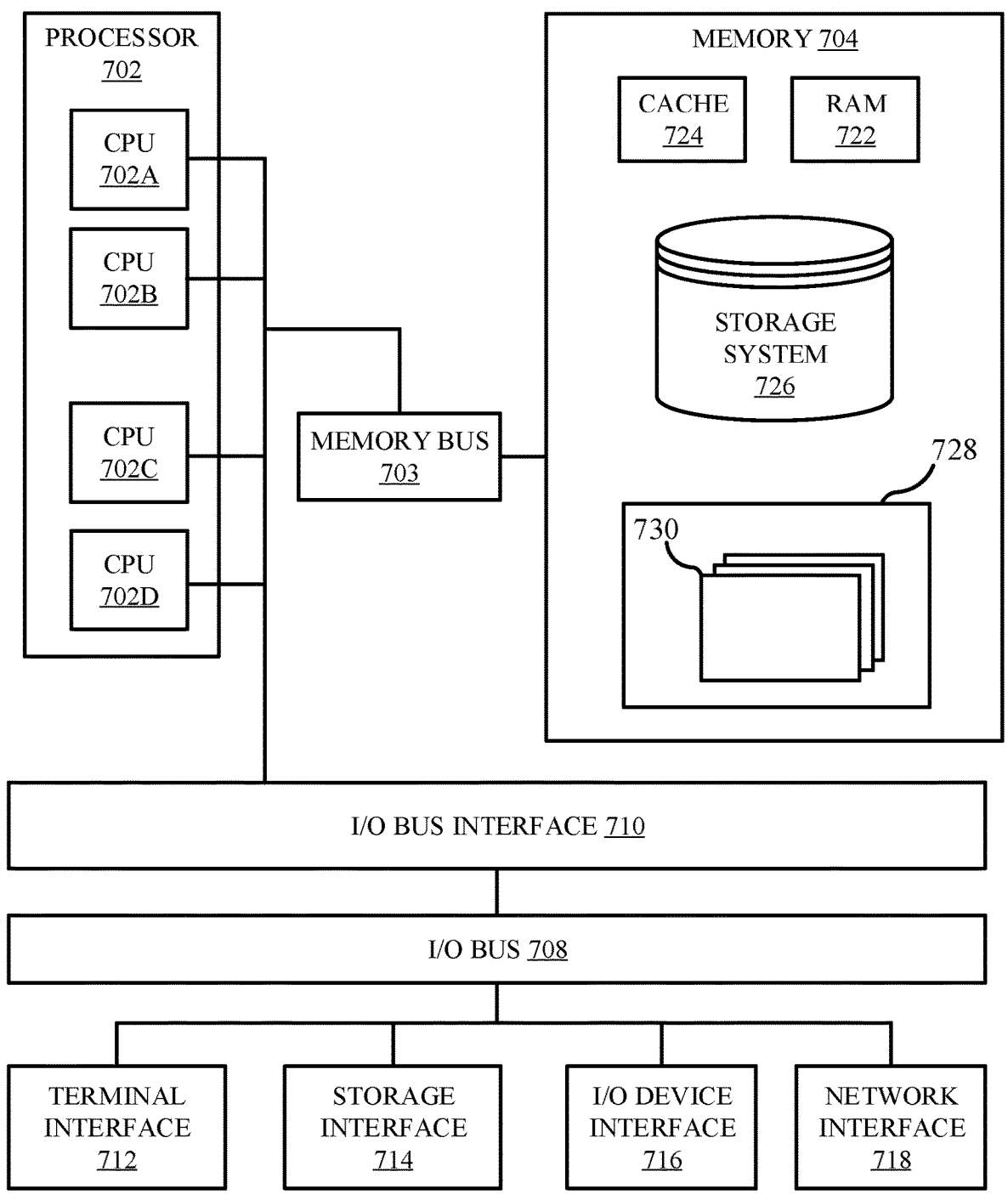
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., interview analysis system 102, device 160, or natural language processing system 212) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 728 and/or program modules 730 generally perform the functions or methodologies of various embodiments.

In some embodiments, the program modules 730 of the computer system 701 include an interview management module. The interview management module may be configured to receive audio data, process the audio data, and build individual profiles based on the audio data. Further, the interview management module may be configured to use the generated profiles for various interview considerations, including panel selection, question prompting, and performance prediction.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
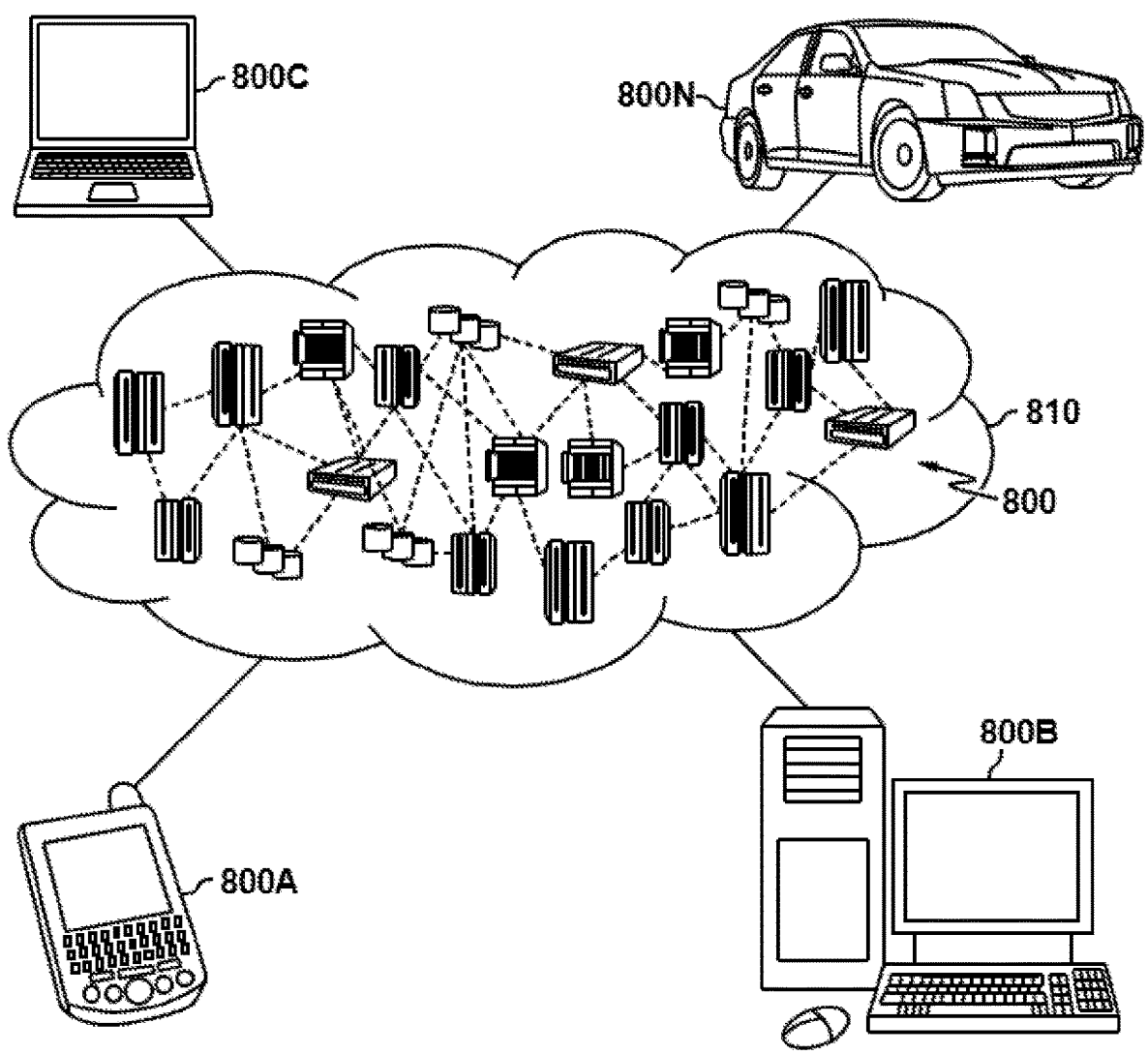
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A, desktop computer 800B (e.g., interview analysis system 102, device 160, and natural language processing system 212) laptop computer 800C (e.g., interview analysis system 102, device 160, and natural language processing system 212), and/or automobile computer system 800N can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
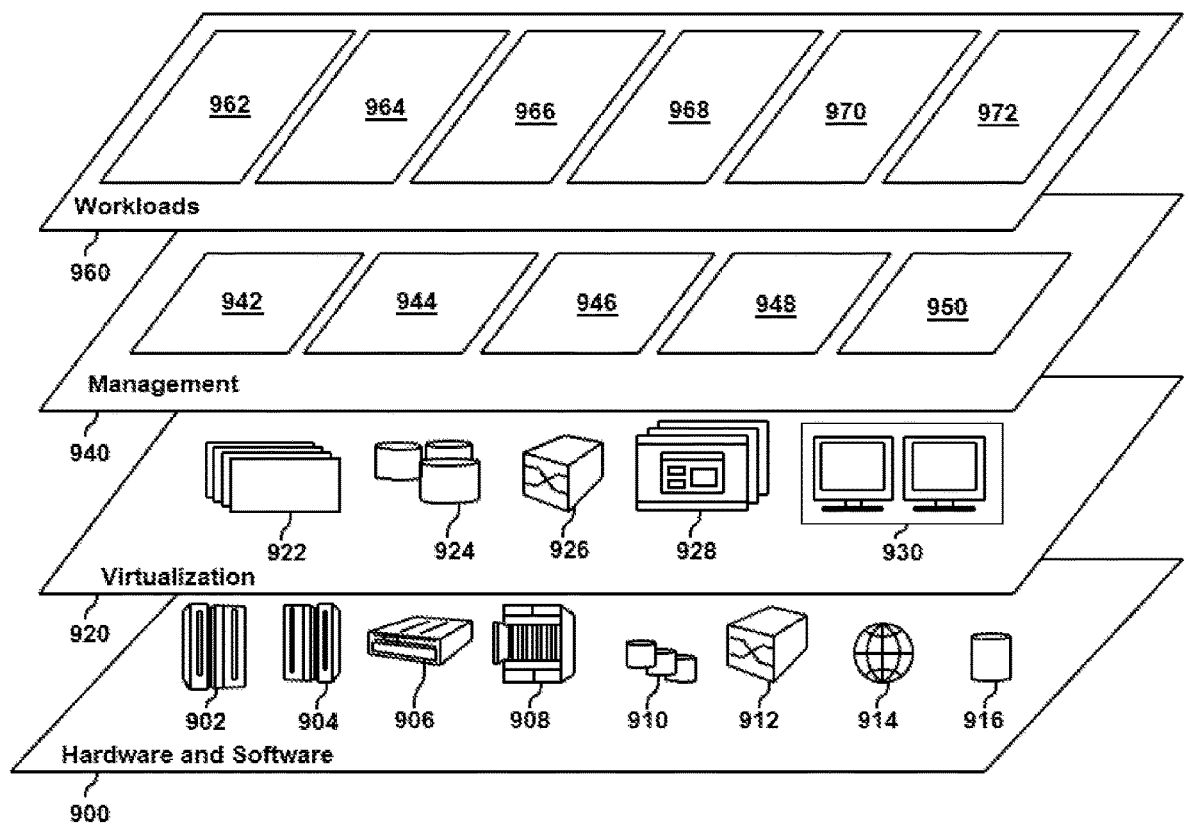
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices (e.g., devices 102 of FIG. 1) which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines (e.g., interview analysis system 102, device 160, and natural language processing system 212) in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and identifying an identifiable media 972.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system comprising;
    at least one memory component;
    at least one processor;
    a data receiving module configured to receive audio data from an interviewer in an interview;

a data structuring module configured to process the audio data, wherein processing the audio data includes converting the audio data into text and structuring the text;

a data analysis module configured to analyze the structured text, wherein the data analysis module is further configured to:
- determine at least one tonal dimension of the structured text;
- identify a set of questions in the structured text;
- determine at least one classification dimension of the set of questions in the structured text; and
- determine at least one difficulty dimension of the set of questions in the structured text;

a feature vector generation module configured to generate a feature vector having the at least one determined tonal dimension, the at least one determined class dimension, and the at least one determined difficulty dimension;

wherein the feature vector generation module is configured to receive a reference feature vector having at least one reference tonal dimension, at least one reference class dimension, and at least one reference difficulty dimension, wherein the reference feature vector indicates panel selection requirements regarding an upcoming interview;

wherein the feature vector generation module is further configured to sum the feature vector with a plurality of additional feature vectors each having a tonal dimension, a class dimension, and a difficulty dimension generated for each of a plurality of respective interviewers to receive a summed feature vector, compare the summed feature vector to the reference feature vector, and determine whether the comparison between the summed feature vector and reference feature vector satisfies a match threshold; and wherein the feature vector generation module is further configured to select, in response to the comparison satisfying the match threshold, the plurality of interviewers for the panel on the upcoming interview and transmit the selection.

2. The system of claim 1, wherein for determining the at least one classification dimension of the set of questions in the structured text, the data analysis module is further configured to:
- compare each question of the set of questions to a classification repository, wherein the classification repository includes key words mapped to classifications;
- determine that a question of the set of questions corresponds to a key word in the classification repository; and
- classify, in response to a question of the set of questions corresponding to the key word in the classification repository, the question with the classification that is mapped to the key word.

3. The system of claim 1, wherein for determining the at least one difficulty dimension of the set of questions in the structured text, the data analysis module is further configured to:
- compare each question of the set of questions to questions in a question database, wherein each question in the question database has a predetermined difficulty rating; and
- determine, in response to a question of the set of questions corresponding to a second question in the question database, that the question of the set of questions has the same difficulty rating as the second question in the question database.

4. The system of claim 1, wherein determining whether the comparison between the summed feature vector and reference feature vector satisfies the match threshold is based on a lower limit threshold for each of the at least one reference tonal dimension, the at least one reference classification dimension, and the at least one reference difficulty dimension.

5. The system of claim 1, wherein the audio data is received in real-time while the interview is occurring.

6. The system of claim 5, wherein the structured text data is time-stamped based on when the audio data was received.

7. A method comprising:
- receiving audio data from an interviewer in an interview;
- processing the audio data, wherein processing the audio data includes converting the audio data into text and structuring the text;
- analyzing the structured text, wherein analyzing the structured text includes:
  - determining at least one tonal dimension of the structured text;
  - identifying a set of questions in the structured text;
  - determining at least one classification dimension of the set of questions in the structured text; and
  - determining at least one difficulty dimension of the set of questions in the structured text;
- generating a feature vector having the at least one determined tonal dimension, the at least one determined class dimension, and the at least one determined difficulty dimension;
- receiving a reference feature vector having at least one reference tonal dimension, at least one reference class dimension, and at least one reference difficulty dimension, wherein the reference feature vector indicates panel selection requirements regarding an upcoming interview;
- summing the feature vector with a plurality of additional feature vectors each having a tonal dimension, a class dimension, and a difficulty dimension generated for each of a plurality of respective interviewers to receive a summed feature vector;
- comparing the summed feature vector to the reference feature vector;
- determining whether the comparison between the summed feature vector and reference feature vector satisfies a match threshold;
- selecting, in response to the comparison satisfying the match threshold, the plurality of interviewers for the panel on the upcoming interview; and
- transmitting the selection.

8. The method of claim 7, wherein each question of the set of questions is identified based on question identifiers.

9. The method of claim 7, wherein determining at least one classification dimension of the set of questions in the structured text further comprises:
- comparing each question of the set of questions to questions in a question database, wherein each question in the question database has a predetermined classification; and
- classifying, in response to a question of the set of questions corresponding to a second question in the question database, the question of the set of questions with the predetermined classification corresponding to the second question in the question database.

10. The method of claim 7, wherein determining the at least one difficulty dimension of the set of questions in the structured text further comprises:

comparing each question of the set of questions to questions in a question database, wherein each question in the question database has a predetermined difficulty rating; and determining, in response to a question of the set of questions corresponding to a second question in the question database, that the question of the set of questions has the same difficulty rating as the second question in the question database.

11. The method of claim 7, wherein determining whether the comparison between the summed feature vector and reference feature vector satisfies the match threshold is based on a lower limit and upper limit range for each of the at least one reference tonal dimension, the at least one reference classification dimension, and the at least one reference difficulty dimension.

12. The method of claim 7, wherein the audio data is received in real-time while the interview is occurring.

13. The method of claim 12, wherein the structured text data is time-stamped based on when the audio data was received.

14. A computer program product comprising a computer readable storage medium having program instructions embodied therewith, the program instructions executable by a processor to cause the processor to perform a method comprising:
receiving audio data from an interviewer in an interview;
processing the audio data, wherein processing the audio data includes converting the audio data into text and structuring the text;
analyzing the structured text, wherein analyzing the structured text includes:
determining at least one tonal dimension of the structured text;
identifying a set of questions in the structured text;
determining at least one classification dimension of the set of questions in the structured text; and
determining at least one difficulty dimension of the set of questions in the structured text;
generating a feature vector having the at least one determined tonal dimension, the at least one determined class dimension, and the at least one determined difficulty dimension;
receiving a reference feature vector having at least one reference tonal dimension, at least one reference class dimension, and at least one reference difficulty dimension, wherein the reference feature vector indicates panel selection requirements regarding an upcoming interview;
summing the feature vector with a plurality of additional feature vectors each having a tonal dimension, a class dimension, and a difficulty dimension generated for each of a plurality of respective interviewers to receive a summed feature vector;
comparing the summed feature vector to the reference feature vector;
determining whether the comparison between the summed feature vector and reference feature vector satisfies a match threshold;
selecting, in response to the comparison satisfying the match threshold, the plurality of interviewers for the panel on the upcoming interview; and
transmitting the selection.

15. The computer program product of claim 14, wherein each question of the set of questions is identified based on question identifiers.

16. The computer program product of claim 14, wherein determining the at least one classification dimension of the set of questions in the structured text further comprises:
comparing each question of the set of questions to questions in a question database, wherein each question in the question database has a predetermined classification; and
classifying, in response to a question of the set of questions corresponding to a second question in the question database, the question of the set of questions with the predetermined classification corresponding to the second question in the question database.

17. The computer program product of claim 14, wherein determining the at least one difficulty dimension of the set of questions in the structured text further comprises:
comparing each question of the set of questions to questions in a question database, wherein each question in the question database has a predetermined difficulty rating; and
determining, in response to a question of the set of questions corresponding to a second question in the question database, that the question of the set of questions has the same difficulty rating as the second question in the question database.

18. The computer program product of claim 14, wherein determining whether the comparison between the summed feature vector and reference feature vector satisfies the match threshold is based on an upper limit threshold for each of the at least one reference tonal dimension, the at least one reference classification dimension, and the at least one reference difficulty dimension.

19. The computer program product of claim 14, wherein the audio data is received in real-time while the interview is occurring.

20. The computer program product of claim 19, wherein the structured text data is time-stamped based on when the audio data was received.

* * * * *